June 12, 1956  J. W. BLACK, JR  2,750,238
WHEEL AND BEARING STRUCTURE AND SEAL THEREFOR
Filed May 19, 1955

INVENTOR.
John W. Black Jr.
BY
Otto A. Earl
Attorney

United States Patent Office 2,750,238
Patented June 12, 1956

2,750,238

WHEEL AND BEARING STRUCTURE AND SEAL THEREFOR

John W. Black, Jr., Kalamazoo, Mich., assignor to Pemco Wheel Company, Kalamazoo, Mich.

Application May 19, 1955, Serial No. 509,627

7 Claims. (Cl. 308—187.1)

This invention relates to improvements in a wheel and bearing structure and seal therefor. The principal objects of this invention are:

First, to provide a novel form of wheel and bearing structure which can be inexpensively and accurately assembled from a minimum number of parts.

Second, to provide a wheel structure in which the main load carrying and bearing retaining elements are inexpensively formed stampings which join together to provide drain openings formed between the assembled parts.

Third, to provide a novel form of seal for enclosing the bearings of a stamped wheel structure which seal is easily assembled on the wheel and retained in sealing engagement with the parts of the wheel.

Fourth, to provide a novel bearing and seal assembly for a stamped wheel that is easily assembled and self retaining and which coacts with the normal mounting of the wheel to further retain the seal structure in position.

Other objects and advantages of the invention will be apparent from a consideration of the following description and claims. The drawings of which there is one sheet illustrate a preferred form of the wheel and bearing assembly.

Figures 1, 2:
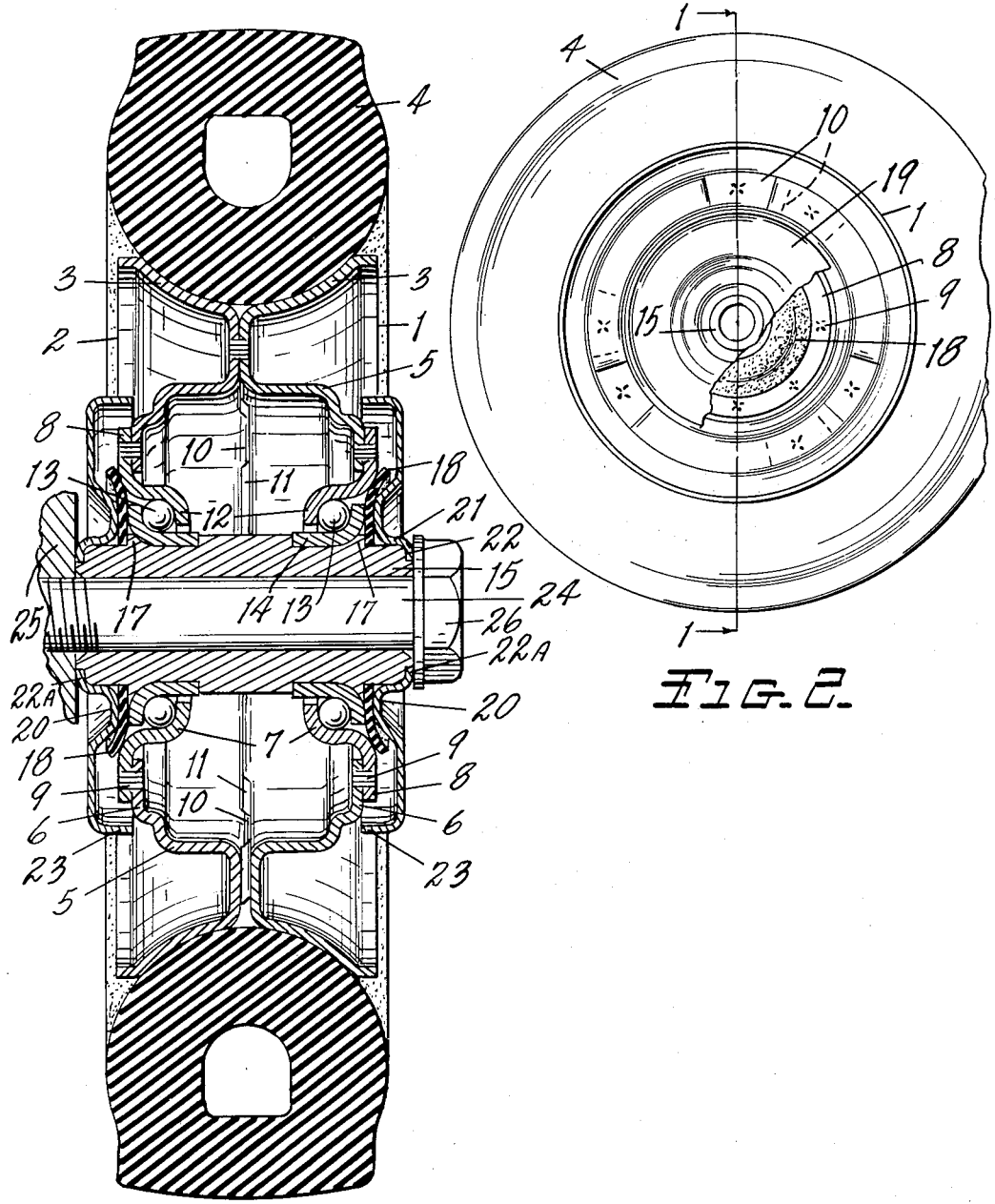
Fig. 1 is a diametrical cross sectional view through the wheel and bearing with the wheel mounted on a fixed axle.
Fig. 2 is a fragmentary side elevational view of the wheel partially broken away to illustrate the position of the seal on the wheel.

The wheel comprises a pair of identical discs 1 and 2 formed as sheet metal stampings and provided with outturned rims 3 on their outer edges which support the resilient tire 4. The radially inner portions of the discs 1 and 2 are provided with axially outturned hub portions 5 with flat annular radially inturned flanges 6 at their edges. Secured to each of the flanges 6 is a cupped outer bearing member 7 having an outer flange 8 welded to the adjacent flange 6 as at 9. The discs 1 and 2 and the outer bearing members 7 form the main load carrying members of the wheel.

The annular central portions of the discs 1 and 2 between the rims 3 and hub portions 5 are provided with axially offset segmental spacer portions 10 and the two identical discs are angularly offset so that the segmental portions 10 of one disc engage the other disc between its segmental portions thus leaving arcuate slots 11 opening from the interior of the hub to the periphery of the wheel. These slots permit ready entrance and exit of degreasing and washing fluids to and from all surfaces of the assembled wheel stamping when the wheels are produced on a mass production basis.

The cupped outer bearing members 7 project axially inwardly into the interior of the hub portions 5 and are provided with radially inwardly turned inner flanges 12 forming raceways for the ball or other rolling bearing elements 13. The ball bearings 13 coact with inner bearing members 14 that are annular stamped rings of angular radial cross section. The inner bearing members 14 are fixedly secured to the tubular spindle 15. The spindle 15 is provided with axially outwardly facing seats or shoulders against which the inner ends of the inner bearing members 14 are abutted. The outer ends of the inner bearing members 14 are retained in place by axially upsetting the ends of the spindle as at 17.

After the bearing assemblies 12, 13 and 14 are assembled into the wheel discs and onto the spindle 15 the bearings are sealed to prevent the entrance of dust into the bearings and to retain lubricant within the wheel hub by means of flat annular flexible seal members 18 and end caps 19. The flexible seals 18 slip easily over the ends of the spindle and against the shoulders created by the upset portions 17. The caps are formed as sheet metal stampings and have inwardly extending annular beads 20 formed therein to press the seals 18 against both the inner and outer bearing members 7 and 14. The radially inner walls of the beads 20 are press fitted around the ends of the spindle as at 21 to retain the caps on the spindles. The extreme ends of the spindles are provided with radially and axially outwardly facing grooves or notches 22 that receive inturned flanges 22A around the center of caps 19. The peripheries of the caps 19 extend radially in spaced relationship to the seal members 18 and the outer flanges 8 of the outer bearing members. Axially turned flanges 23 on the outer edges of the caps embrace the outer bearing members 7 to protect the seals from stones and externally applied blows of any sort.

When the wheel and spindle are assembled on an axle 24 and against a support 25 for the axle the end flanges 22A of the caps are further retained in position against the support 25 and the axle nut 26.

It is pointed out both the seal members 18 and the caps 19 can be pressed over the cylindrical ends of the spindle with a minimum of effort because there are no grooves in the outer ends of the spindles to interfere with mounting the seal members. The wheel and bearing is therefore easily assembled and the seal around the bearing is permanently retained for convenience in handling and shipping the wheels before the wheels are mounted on the spindle. The seal members 18 and the caps 19 are non-rotatably connected to the spindle and rotation of the outer bearing members with the wheel discs creates a sliding sealing engagement with the outer portions of the seals. The caps 19 prevent accidental damage to the end seals.

Having thus described my invention what I claim as new and desire to secure by Letters Patent is:

1. A wheel comprising metal discs secured back to back and having axially spaced hub portions, a hollow spindle disposed through said hub portions, fixed and rotating bearing members carried by said spindle and said discs at the ends of said hub portions and having rolling anti-friction elements disposed between the bearing members, the outer ends of the fixed bearing members being spaced axially inwardly of the outer ends of the rotating bearing members, flat annular flexible seals disposed around the ends of said spindle, and end caps fixedly mounted on the ends of said spindle outwardly from said seals, said end caps having axially inwardly offset annular beads pressing said seals against said fixed bearing members and deflecting the rims of the seals into sealing engagement with said rotating bearing members, said caps having radially inner edges seated in shouldered notches in the ends of said spindle and having radially outer rims turned axially over the rims of said fixed bearing members.

2. A wheel comprising metal discs secured back to back and having axially spaced hub portions, a spindle disposed through said hub portions, fixed and rotating bearing members carried by said spindle and said discs at the ends of said hub portions and having rolling anti-friction elements disposed between the bearing members, the outer ends of the fixed bearing members being spaced axially inwardly of the outer ends of the rotating bearing members, flat annular flexible seals disposed around the ends of said spindle, and end caps fixedly mounted on the ends of said spindle outwardly from said seals, said end caps having axially inwardly offset annular beads pressing said seals against said fixed bearing members and deflecting the rims of the seals into sealing engagement with said rotating bearing members.

3. A wheel comprising metal discs secured back to back and having axially spaced hub portions, a spindle disposed through said hub portions, fixed and rotating bearing members carried by said spindle and said discs at the ends of said hub portions and having rolling anti-friction elements disposed between the bearing members, the outer ends of the fixed bearing members being spaced axially inwardly of the outer ends of the rotating bearing members, flat annular flexible seals disposed around the ends of said spindle, and end caps fixedly mounted on the ends of said spindle outwardly from said seals, said end caps having axially inwardly offset portions pressing said seals and deflecting the rims of the seals into sealing engagement with said rotating bearing members, said caps having radially inner edges seated in shouldered notches in the ends of said spindle.

4. A wheel and bearing assembly comprising a spindle member, a wheel provided with axially spaced wheel bearing members having annular outwardly facing radially curved surfaces, spindle bearing members nonrotatably mounted on said spindle member in opposed relation to said wheel bearing members with their outer ends disposed in planes within the planes of said surfaces of said wheel bearing members, said spindle member having annular shoulders disposed in approximately the planes of the outer ends of said spindle bearing members, disk-like bearing closure members of resilient material sleeved upon the ends of said spindle members against said shoulders thereof and in supported relation to the outer ends of said spindle bearing members and with outer portions thereof in flexed lapping engagement with said annular surfaces of said wheel bearing members, retaining and supporting members for said closure members mounted on the ends of the spindle to clampingly support the closure members against the outer ends of the spindle bearing members with the outer portions of the closure members in flexed engagement with said annular surfaces of said wheel bearing members.

5. A wheel and bearing assembly comprising a spindle member, a wheel provided with axially spaced wheel bearing members having annular outwardly facing radially curved surfaces, spindle bearing members nonrotatably mounted on said spindle member in opposed relation to said wheel bearing members with their outer ends disposed in planes within the planes of said surfaces of said wheel bearing members, bearing closure members of resilient material sleeved upon the ends of said spindle members and in supported relation to the outer ends of said spindle bearing members and with outer portions thereof in flexed lapping engagement with said annular surfaces of said wheel bearing members, retaining and supporting members for said closure members mounted on the ends of the spindle to clampingly support the closure members against the outer ends of the spindle bearing members with the outer portions of the closure members in flexed engagement with said annular surfaces of said wheel bearing members.

6. A wheel and bearing assembly comprising a spindle member, a wheel provided with axially spaced wheel bearing members, spindle bearing members nonrotatably mounted on said spindle member in opposed relation to said wheel bearing members with their outer ends disposed in planes within the planes of the outer ends of said wheel bearing members, said spindle members having annular shoulders disposed in approximately the planes of the outer ends of said spindle bearing members, bearing closure members of resilient material sleeved upon the ends of said spindle members against said shoulders thereof and in supported relation to the outer ends of said spindle bearing members and with outer portions thereof in flexed lapping engagement with the outer ends of said wheel bearing members, and retaining and supporting members for said closure members mounted on the ends of the spindle to support the closure members with the outer portions thereof in flexed engagement with the wheel bearing members.

7. A wheel and bearing assembly comprising a spindle member, a wheel provided with axially spaced wheel bearing members, spindle bearing members nonrotatably mounted on said spindle member in opposed relation to said wheel bearing member, said spindle member having annular shoulders disposed in approximately the planes of the outer ends of said spindle bearing members, bearing closure members of flexible resilient material sleeved upon the ends of said spindle members against said shoulders thereof and in supported relation to the outer ends of said spindle bearing members and with outer portions thereof in flexed lapping engagement with said wheel bearing members, and means on the spindle supporting the closure members against the outer ends of the spindle bearing members with the outer portions of the closure members in flexed engagement with the wheel bearing members.

References Cited in the file of this patent

UNITED STATES PATENTS 1,674,087     Beemer                 June 19, 1928